US010235857B2

(12) United States Patent
Jones

(10) Patent No.: US 10,235,857 B2
(45) Date of Patent: Mar. 19, 2019

(54) COMPUTERISED TRACKING AND PROXIMITY WARNING METHOD AND SYSTEM FOR PERSONNEL, PLANT AND EQUIPMENT OPERATING BOTH ABOVE AND BELOW THE GROUND OR THEIR MOVEMENT THEREBETWEEN

(71) Applicant: EMB Safety Helmet Pty Ltd, Kallangur (AU)

(72) Inventor: Jeanette Jones, Kallangur (AU)

(73) Assignee: EMB Safety Helmet Pty Ltd. (AU)

( * ) Notice: Subject to any disclaimer, the term of this patent is extended or adjusted under 35 U.S.C. 154(b) by 0 days.

(21) Appl. No.: 15/505,258

(22) PCT Filed: Sep. 10, 2014

(86) PCT No.: PCT/AU2014/000881
§ 371 (c)(1),
(2) Date: Feb. 21, 2017

(87) PCT Pub. No.: WO2016/029238
PCT Pub. Date: Mar. 3, 2016

(65) Prior Publication Data
US 2017/0270761 A1    Sep. 21, 2017

(30) Foreign Application Priority Data
Aug. 26, 2014   (AU) ................................ 2014903373

(51) Int. Cl.
*G08B 21/02*    (2006.01)
*H04W 4/80*    (2018.01)
(Continued)

(52) U.S. Cl.
CPC ............ *G08B 21/02* (2013.01); *G01S 5/0263* (2013.01); *G01S 5/0294* (2013.01); *G01S 13/74* (2013.01);
(Continued)

(58) Field of Classification Search
CPC ........................... B60W 2550/40; G01S 13/74
USPC .................................................... 340/539.13
See application file for complete search history.

(56) References Cited

U.S. PATENT DOCUMENTS 8,779,934 B2    7/2014   Rothacher et al.
2007/0129869 A1*  6/2007   Gudat .................. G05D 1/0297
                                                        701/50
(Continued)

OTHER PUBLICATIONS

Wireless Tracking and Sensing Systems for Mine Safety, Security and Productivity Management, Somprakash Bandyopadhyay, et al.
(Continued)

*Primary Examiner* — Fabricio R Murillo Garcia
(74) *Attorney, Agent, or Firm* — Skinner and Associates; Joel Skinner

(57) ABSTRACT

A computerized safety tracking and proximity warning method and system for personnel, plant and equipment operating both above and below the ground and moving therebetween comprising a computer adapted to receive wireless position information from transponders carried or worn by personnel, and affixed to plant or equipment via one or more wireless communication protocols to provide a seamless visual display of their relative positions whether above or below ground level or moving therebetween, and wherein an alarm is triggered to alert an operator or worker if the locations of the personnel and plant or equipment are within a predetermined and unsafe distance of each other.

16 Claims, 3 Drawing Sheets

(51) Int. Cl.
  *G01S 19/01* (2010.01)
  *H04W 84/00* (2009.01)
  *G01S 5/02* (2010.01)
  *G01S 13/74* (2006.01)
  *H04W 4/02* (2018.01)
  *G08B 25/10* (2006.01)
  *H04L 29/08* (2006.01)

(52) U.S. Cl.
  CPC ............. *G01S 19/01* (2013.01); *G08B 25/10* (2013.01); *H04L 67/18* (2013.01); *H04W 4/023* (2013.01); *H04W 4/025* (2013.01); *H04W 4/80* (2018.02); *H04W 84/00* (2013.01)

(56) References Cited

U.S. PATENT DOCUMENTS

| | | | |
|---|---|---|---|
| 2010/0127853 A1 | 5/2010 | Hansen | |
| 2010/0289662 A1* | 11/2010 | Dasilva | F16P 3/147 340/686.6 |
| 2011/0249118 A1* | 10/2011 | Bruno | B60W 30/0953 348/148 |
| 2014/0297343 A1* | 10/2014 | Tucker | A01B 69/008 705/7.12 |
| 2016/0005300 A1* | 1/2016 | Laufer | H04W 4/02 340/573.1 |

OTHER PUBLICATIONS

Wireless Information and Safety System for Mines, Bandyopadhyay, Chaulya, Mishra, Choure and Baveja, Journal of Scientific & Industrial Research, vol. 68, Feb. 2009.

* cited by examiner

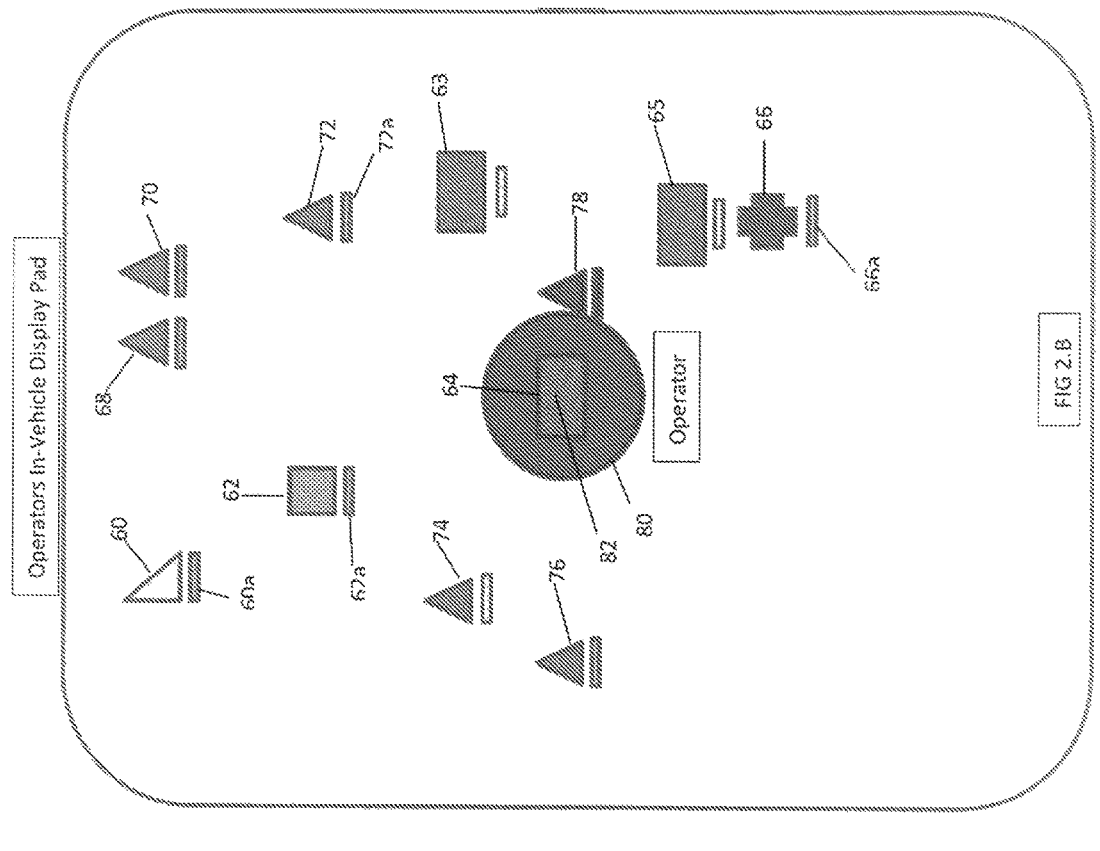
FIG 2.B
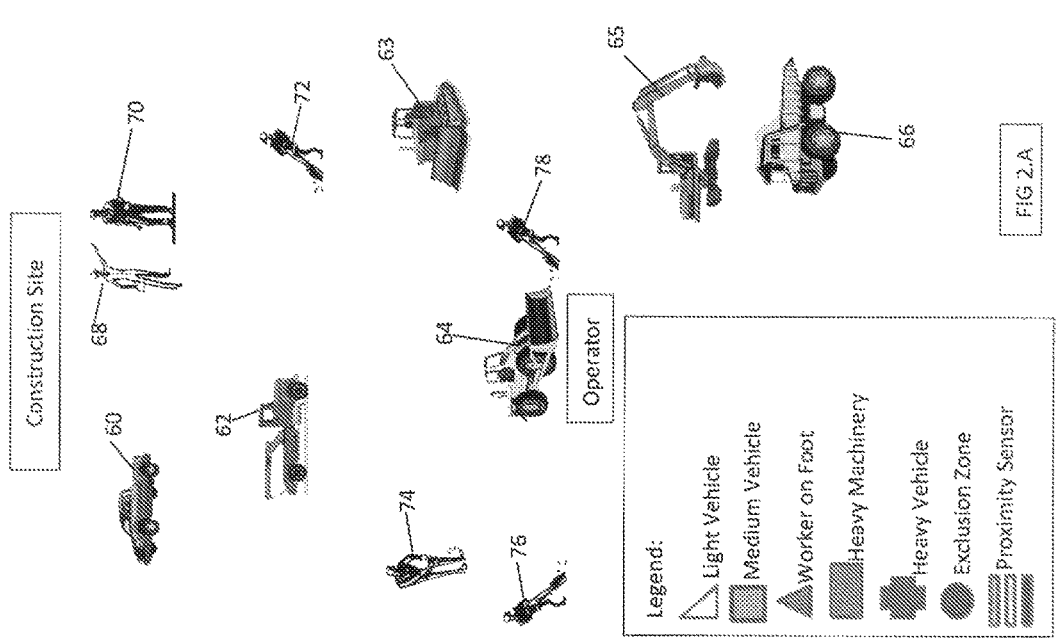
FIG 2.A

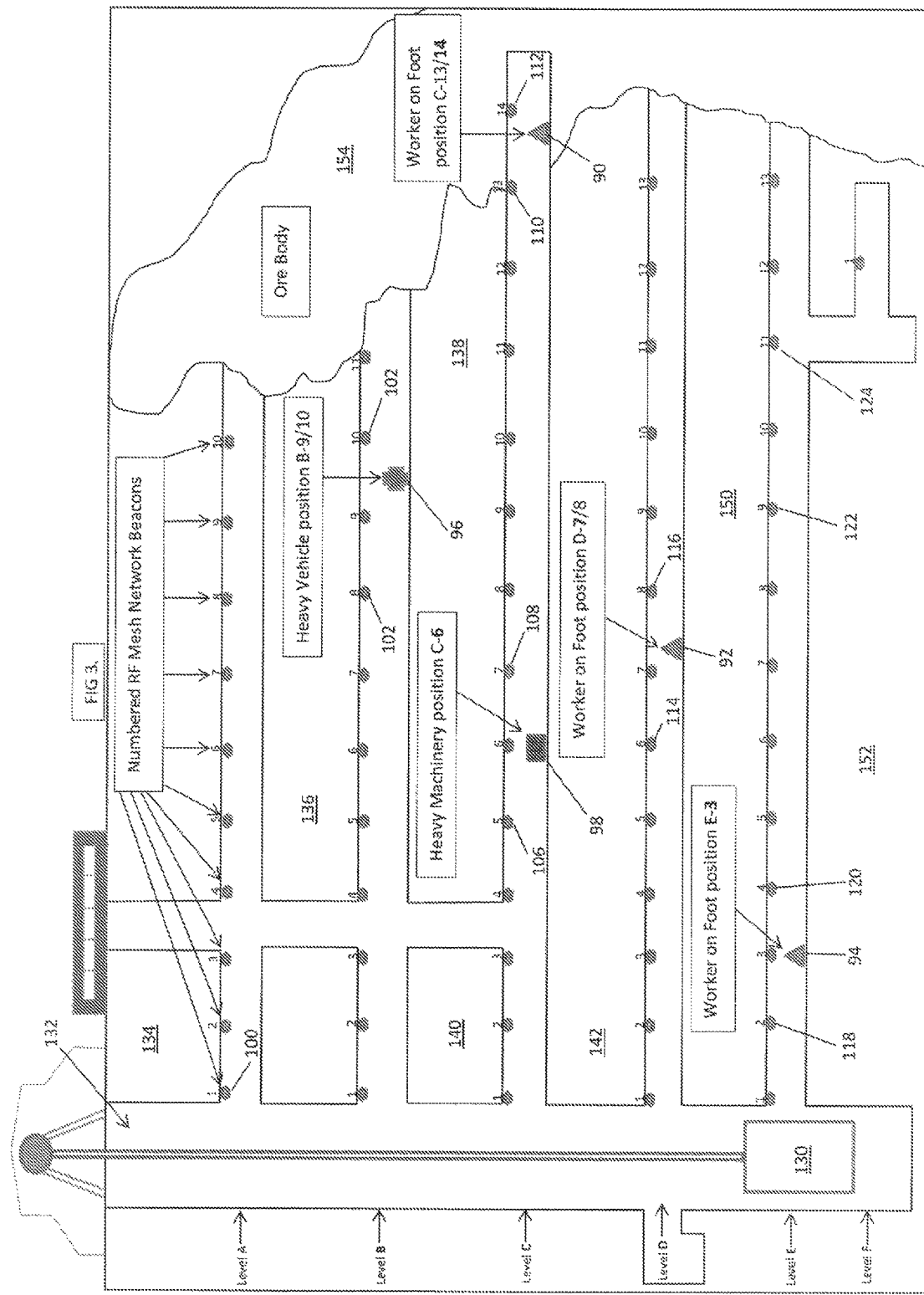

COMPUTERISED TRACKING AND PROXIMITY WARNING METHOD AND SYSTEM FOR PERSONNEL, PLANT AND EQUIPMENT OPERATING BOTH ABOVE AND BELOW THE GROUND OR THEIR MOVEMENT THEREBETWEEN

FIELD OF THE INVENTION

The invention relates to safety apparatus and apparel, in particular to an integrated computerized safety method and system to track in real time the positions of mining, construction and other industrial personnel, plant and equipment both above and below the ground or their movement therebetween. It also comprises a proximity warning system to alert personnel who may be within a predetermined unsafe distance of any plant or equipment including the real time detection and sensing of impact motion or movement and location data which can be compiled or logged.

BACKGROUND OF THE INVENTION

There is currently no effective systems that simultaneous monitor workers on foot who work around plant and machinery both above and below ground. There is no way of alerting workers of a potential danger operating plant and machinery above and/below them or while working in close proximity around the plant and machinery. While there are GPS systems for above ground monitoring, they become useless in a tunnel below ground. On the other hand radio frequency identification devices can be used below ground but are inherently short range devices which require multiple nodes or beacons to activate associated transponders. There is presently no known system which allows the monitoring of a worker as he/she moves above ground to below or underground. In addition, plant and machinery operators do not have a way of monitoring workers on foot or to easily view and locate the workers who are not directly in their line of sight, for example even with the use of mirrors on heavy machinery, it still does not enable the operator to sight all areas of the plant even if they are working on the same level. The problem becomes more acute in below ground operations such as in underground mining or tunneling projects where workers are unsighted behind corners and tunnel walls.

While there may be the use of high visibility personal protection equipment, such as reflective apparel, flashing lights, audible warning alarms and/or safety spotters with radio communication, almost all of these systems require a direct line of sight or transmission to be effective. Audible warning horns or buzzers are also not always activated and can be muffled by workers wearing hearing protection. Furthermore, the direction of travel of moving vehicles or plant such as when reversing can affect the audible warning device. In the case of using human spotters, they also have to be in a direct fine of sight to be effective and may be subject to factors such as human error and in cases where spotter crew may not always be present. Furthermore, the spotters' radios can be muffled by hearing protection and are also of limited use in certain situations.

It is therefore an object of the invention to identify and seamlessly track the positions of workers whether they are working above or below ground level and when moving between the levels. It is a further object of the invention to seek to prevent serious injury or death to workers while interacting with plant and heavy machinery in use with a visual monitoring system that operates both above and below ground level in a seamless manner.

SUMMARY OF THE INVENTION

In a broad aspect, the invention resides in computerized safety tracking and proximity warning system for personnel, plant and equipment operating both above and below the ground and moving therebetween comprising:
   a central computer adapted to receive and process wireless position information from transponders carried or worn by the personnel, and
   transponders attached to the plant or equipment whether above or below ground;
   the wireless position information communicated to the computer via one or more wireless communication modalities or protocols;
   the central computer processing the position information to provide a seamless real time visual display of the relative positions of the personnel and pant or equipment above and/or below ground level or moving therebetween, wherein,
   an alarm is triggered to alert an operator if the relative positions of the personnel and plant or equipment are within a predetermined and unsafe distance of each other.

Preferably, the system is initiated and managed via a smart device application or wireless app implemented system implemented on a smart tablet, smart phone or any other specially adapted smart device.

Preferably, the wireless communication protocols include a wireless personal area network.

Suitably, the wireless communication protocols include a mesh network of radio frequency identification (RFID) chips embedded in safety equipment worn by personnel and incorporated in plant and machinery detected by nodes/beacons to enable communication and facilitate location by triangulation between the RFID chips when operating underground above ground or in the open.

The wireless communication protocols include a global positioning (GPS) system when operating above ground or in the open.

Preferably, the central computer is a server adapted to receive and process wireless position information from all wireless communication modalities or protocols whether operating underground, above ground or in the open wherein the personnel, plant and equipment are tracked in a seamless manner when moving around a site and/or between ground levels which is initiated by and communicated to a wireless app implemented system to be monitored on the visual display.

Preferably, the visual display is a grid representation showing the relative position of the personnel and plant or equipment.

In a more sophisticated version, the visual display can be a real time three dimensional representation showing the relative position and movement of the personnel and plant or equipment both above and below and adjacent to one another.

Suitably, the alarm is triggered and alerted to personnel of plant or equipment within the predetermined unsafe distance through a visual and/or audible response unit carried by personnel or affixed to the plant or equipment.

Preferably, there is sensor to detect any sudden deceleration or charge in direction indicating the possibility of personnel sustaining a fall or being struck or if there has been no movement over a predetermined period of time such as if the personnel has fallen asleep or removed or discarded the system to also trigger the alarm.

More preferably, the sensor continues to trigger the alarm as pulses in a power saving mode until extinguished or switched off to enable detection and/or location of personnel who may be buried or required to be rescued over a period of time.

Preferably, there is real time video imaging means to record the movements of personnel, plan and equipment.

Preferably, the real time positions of the personnel, plant and equipment are stored as a log of events which can be accessed for historical and/or analytical purposes.

Preferably, the transponders, sensors and alarms are embodied in a safety helmet worn by workers including a rechargeable battery supply.

In the alternative, the transponders, sensors and alarms are embodied in a safety vest worn by workers including a rechargeable battery supply.

In another version, the transponders, sensors and alarms are embodied in an item of equipment that is carried by personnel including a rechargeable battery supply.

In another aspect, the invention resides in a method of tracking and warning personnel operating both above and below the ground and moving therebetween using the system according to any of the above claims including the steps of:
- receiving on a central computer, wireless position information from transponders carried or worn by personnel, and attached to the plant or equipment;
- processing the position information on the central computer;
- providing a visual display of the relative positions of the personnel and plant or equipment above and/or below ground level or moving therebetween, and if the locations of the personnel and plant or equipment are within a predetermined and unsafe distance of each other,
- triggering an alarm to alert a supervisor, operator or worker of the imminent danger.

Preferably plain or coloured symbols or icons are used to represent and distinguish personnel and type of plant or equipment on the combined visual display.

There can be coloured bars displayed below the symbols or icons to indicate how close the personnel, plant or equipment represented by the symbols or icons are to other personnel, plant or equipment in the immediate vicinity.

It will be obvious to the skilled addressee that the system or method herein described can be provided and managed as a web based service or facility for clients, typically mining and construction companies in need of a safety tracking and proximity warning system for personnel, plant and equipment and a recorded and analytical log of events.

BRIEF DESCRIPTION OF THE DRAWINGS

In order that the invention be understood, reference is made to the accompanying drawings wherein:

FIG. 2A and FIG. 2B are a diagram and a visual display of an in-vehicle operator's smart device tablet showing the real time positions of personnel and plant or equipment.

FIG. 3 is a visual display of a supervisor's smart device tablet showing a profile of an underground mesh network of radio frequency equipment worn by personnel and incorporated in plant and machinery detected by nodes/beacons.

DETAILED DESCRIPTION OF THE EMBODIMENTS

Figure 1:
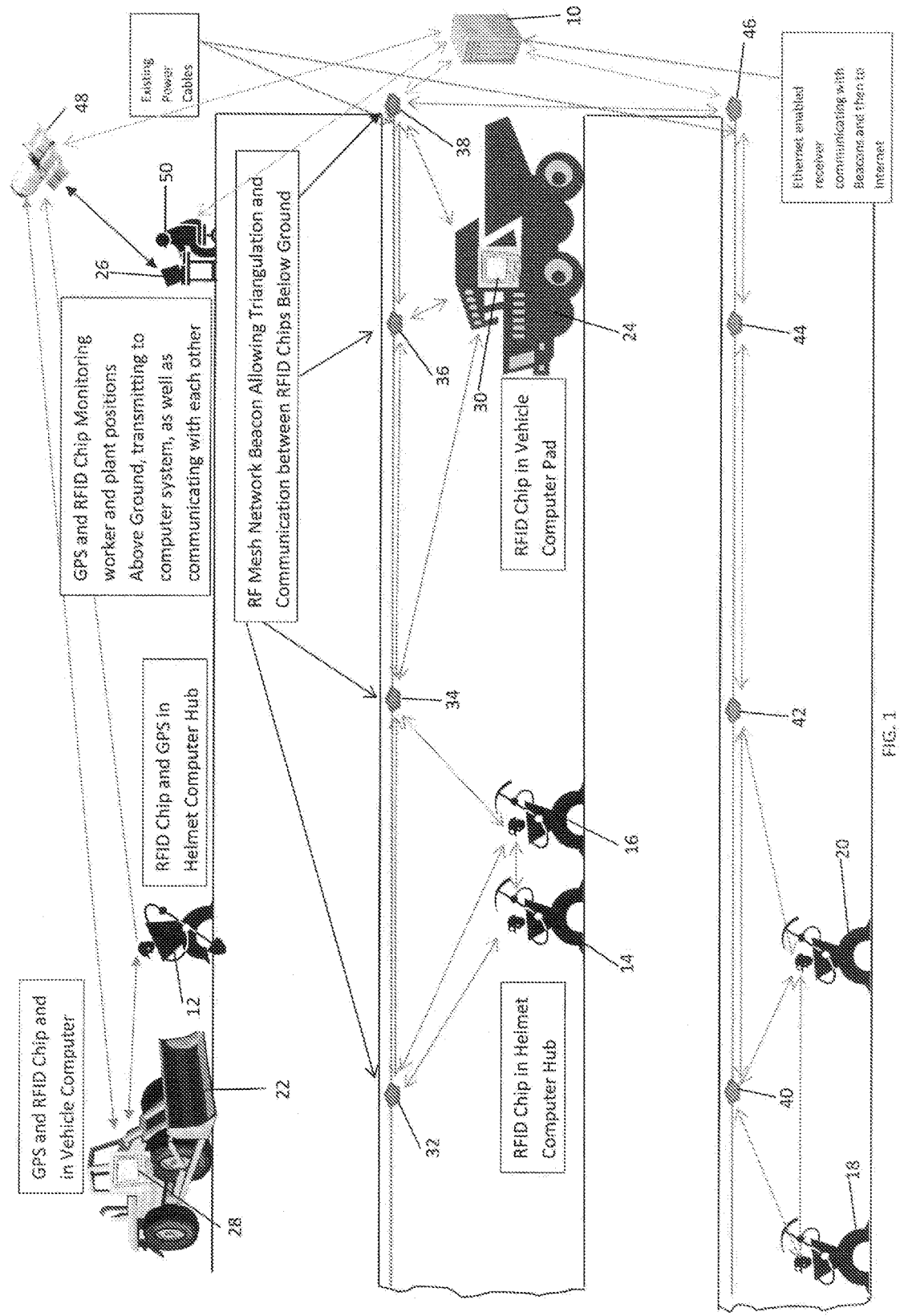
FIG. 1 is a diagram showing a working embodiment of the invention.

As shown in FIG. 1 the computerized safety tracking and proximity warning system for personnel, plant and equipment operating both above and below ground level. There is a central computer 10 adapted to receive and process wireless position information from transponders carried or worn by the personnel 12-20 in helmets and transponders attached to the plant or equipment. The wireless position information is communicated to the computer via one or more wireless communication protocols. The central computer processes the position information to provide a seamless visual display of the relative positions of the personnel and plant or equipment above and/or below ground level or moving therebetween, and wherein, a visual and auditory alarm is triggered to alert a worker wearing the helmet and/or a supervisor if the relative positions of the personnel 12, 14-20 and plant or equipment 22, 24 are within a predetermined and unsafe distance of each other. The distance can be predetermined or preset to a preferred spherical safety radius, for example, of three (3) meters. The system is embodied in the form of a smart device application or app implemented system operated on a smart tablet, smart phone or any other specially adapted smart device 26, 28, 30. The wireless communication protocols include a wireless personal area network e.g. Bluetooth. The wireless communication protocols includes a radio frequency mesh network of nodes/beacons 32-46 and transponder radio frequency identification (REID) chips embedded in safety equipment worn by personnel 12, 14-20 and incorporated in plant and machinery 22, 24 to enable communication and facilitate location by triangulation between the RFID chips when operating underground, above ground or in the open.

There is also a global positioning (GPS) system 48 when operating above ground communication with central computer 10, smart device 28 on machinery 22 and helmet worn by worker 12. In addition, the central computer 10 receives wireless position information from the transponders 32-46 which in turn communicates with GPS satellite 48 wherein wireless position data of personnel and plant or equipment above or underground and moving therebetween can be monitored and displayed on a visual display in a seamless manner. The combined visual display can be a real time three dimensional grid using icons or symbols representing the relative and real time positions and movements of the personnel and plant or equipment both above and below ground or moving between levels as well as adjacent to one another. An alarm is triggered and alerted to a supervisor 50 and/or personnel 12-20 of plant or equipment 22, 24 within the predetermined unsafe distance through a visual and/or audible response unit carried by the personnel or affixed to the plant or equipment 20, 22. There are sensors in the helmets of personnel 12-20 to detect any sudden deceleration or change in direction indicating the possibility of personnel sustaining a fall or being struck or if there has been no movement over a predetermined period of time such as if personnel have fallen asleep or removed or the helmet has been discarded or dislodged which also triggers the alarm. The sensor will preferably continue to trigger the alarm as pulses in a power saving mode until extinguished or switched off to enable detection and/or location of buried personnel by triangulation of detected signals who may require to be rescued over a period of time. There is preferably real time video imaging means to record the movements of personnel, plant and equipment. The recorded positions of the mining personnel, plant and equipment can then be stored as a log of events which can be accessed by an operational supervisor 50 either on site or remotely located for historical and/or analytical purposes. The transponders, sensors and alarms in the safety helmet are suitably powered by a rechargeable battery supply also located in the helmet.

FIG. 2A and FIG. 26 are a diagram and a visual display of an in-vehicle operator's smart device tablet showing the real time positions of personnel and plant or equipment.

Symbols 60-66 in FIG. 26 are moving icons of the real time positions of the identically numbered plant and equipment 60-66 of FIG. 2A. Symbols 68-78 in FIG. 2B are moving icons of the real time positions of the identically numbered personnel 68-78 of FIG. 2A. The shapes of the icons can be used to distinguish light vehicles with right triangles 60, medium sized vehicles with squares 62, workers with isosceles triangles 68-78, heavy machinery with rectangles heavy vehicles with crosses, and an exclusion zone 80 as a circle round a heavy machine 82. The icons can be further distinguished by being of different colours to indicate their size and danger classification for example the exclusion zone 80 can be coloured red when the worker 78 is in dangerous proximity to heavy machine 82. There can be different coloured bars e.g. 60a, 62a, 72a, 66a below each icon to represent how close the personnel, plant or equipment represented by the icons 60, 62, 72, 66, respectively, are to other personnel, plant or equipment in the vicinity.

FIG. 3 is a visual display of a supervisor's smart device tablet showing a profile of an underground mesh network of radio frequency equipment worn by personnel 92, 94, 96 and incorporated in plant and machinery 96, 98 detected by nodes/beacons e.g. 100-124. There is also a visual representation of a lift 130 positioned in mine shaft 132 to access tunnels e.g. 134-152 and that of an ore body 154. It will also be obvious that the information and data collected by recording the events visually displayed and discussed in the examples of FIGS. 2A and 2B, and FIG. 3 can be later used as a safety historical and analytical log of events.

It will of course be realized that while the foregoing has been given by way of illustrative example of this invention, all such and other modifications and variations thereto as would be apparent to persons skilled in the art are deemed to fait within the broad scope and of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The invention claimed is:

1. A computerized safety tracking and proximity warning system for personnel, plant and equipment, the personnel, plant and equipment operating both above and below ground and moving between above and below the ground, comprising:
    a plurality of passive transponders, wherein each personnel, plant and equipment carries at least one of the plurality of passive transponders;
    a central computer in wireless communication with each of the plurality of transponders via one or more wireless protocols;
    a visual display;
    at least one alarm;
    wherein the central computer is adapted to:
        wirelessly receive position information from each of the plurality of transponders and combine the received position information to determine relative positions of each of the personnel, plant or equipment carrying transponders, to each other;
        display the relative positions of each of the personnel, plant, or equipment carrying the transponders on the visual display; and
        trigger the alarm upon determining that the relative position between any tow of the personnel, plant, and equipment carrying transponders corresponds to a relative distance below a predetermined value; and
    a sensor in communication with the central computer to detect any sudden deceleration or change in direction or if there has been no movement by the personnel over a predetermined period of time, wherein the sensor continues to trigger the alarm as pulses in a power saving mode until extinguished or switched off to enable detection and/or location of the personnel who are required to be rescued over the period of time;
        wherein the central computer is adapted to activate the alarm upon detection of one or more of sudden deceleration, change in direction or no movement by the personnel over the predetermined period of time.

2. The system of claim 1, initiated and managed via a smart device application or wireless app implemented system implemented on a smart tablet, smart phone or any other specially adapted smart device.

3. The system of claim 1, wherein the one or more wireless protocols include a wireless personal area network.

4. The system of claim 1, wherein the one or more wireless protocols include:
    a mesh network of radio frequency identification (RFID) chips embedded in safety equipment worn by personnel and incorporated in plant and equipment; and
    one or more nodes or beacons adapted to detect the RFID chips;
    wherein the one or more nodes or beacons facilitate locating the personnel, plant and equipment by triangulation between the RFID chips when operating underground, above ground or in an open area.

5. The system of claim 1, wherein the one or more wireless protocols include a global positioning (GPS) system.

6. The system of claim 1, wherein the visual display is a real time three dimensional representation showing the relative positions and movement of the personnel, plant, or equipment.

7. The system of claim 1, wherein the alarm comprises a visual and/or audible response unit carried by the personnel or affixed to the plant or equipment.

8. The system of claim 1, further comprising real time video imaging means to record movements of the personnel, plant or equipment.

9. The system of claim 1, wherein real time positions of the personnel, plant or equipment are stored as a log of events.

10. The system according to claim 1, wherein the plurality of passive transponders are embodied in a safety helmet worn by workers including a rechargeable battery supply.

11. The system according to claim 1, wherein the plurality of passive transponders are embodied in a safety vest worn by workers including a rechargeable battery supply.

12. The system according to claim 1, wherein the plurality of passive transponders are embodied in an item of equipment that is carried by the personnel including a rechargeable battery supply.

13. The system according to claim 1, wherein the central computer comprises a server adapted to receive and process wireless position information via the one or more wireless protocols whether operating underground, above ground or in an open area;

wherein the personnel, plant or equipment are tracked in a seamless manner when moving around a site and/or between ground levels which is initiated by and communicated to a wireless app implemented system to be monitored on the visual display.

14. The system according to claim 1, wherein plain or colored symbols or icons are used to represent and distinguish personnel and type of plant or equipment on the visual display.

15. The system according to claim 14, wherein there are colored bars displayed below the symbols or icons to indicate how close the personnel, plant or equipment are to other personnel, plant or equipment in their immediate vicinity.

16. The system according to claim 1, provided and managed as a web based service or facility for clients in need of a safety tracking and proximity warning system for the personnel, plant and equipment and recorded as an analytical log of events.

* * * * *